(12) United States Patent
Darling

(10) Patent No.: US 6,748,694 B1
(45) Date of Patent: Jun. 15, 2004

(54) BREAKAWAY LINE ATTACHMENT FOR HOOKS ON FISHING LURES

(75) Inventor: Michael McCann Darling, 4004 North Ave. West, Missoula, MT (US) 59804

(73) Assignee: Michael McCann Darling, Missoula, MT (US)

( * ) Notice: Subject to any disclaimer, the term of this patent is extended or adjusted under 35 U.S.C. 154(b) by 0 days.

(21) Appl. No.: 10/263,613

(22) Filed: Oct. 3, 2002

(51) Int. Cl.[7] ............................................. A01K 91/00
(52) U.S. Cl. .................... 43/43.12; 43/44.83; 43/42.49
(58) Field of Search ........................ 43/43.12, 42.49, 43/44.83

(56) References Cited

U.S. PATENT DOCUMENTS

| | | | | |
|---|---|---|---|---|
| 1,974,381 A | * | 9/1934 | Swanson et al. ............ | 43/42.74 |
| 2,768,468 A | * | 10/1956 | Kibler et al. ............... | 43/43.12 |
| 3,516,192 A | * | 6/1970 | MacLeod et al. ........... | 43/43.12 |
| 3,541,720 A | * | 11/1970 | Buffet ......................... | 43/43.19 |
| 3,686,787 A | * | 8/1972 | Milovich ..................... | 43/44.9 |
| 3,778,918 A | * | 12/1973 | Emory et al. ............... | 43/43.12 |
| 3,782,764 A | * | 1/1974 | Browning .................... | 289/17 |
| 4,101,152 A | * | 7/1978 | Gardipee .................... | 289/17 |
| 4,696,121 A | * | 9/1987 | Hernden ..................... | 43/17.2 |
| 5,351,434 A | * | 10/1994 | Krenn ........................ | 43/44.91 |

* cited by examiner

*Primary Examiner*—Peter M. Poon
*Assistant Examiner*—Joan M. Olszewski

(57) ABSTRACT

A breakaway line 10 is disclosed which fails at a predetermined tension level, and when interposed between a fishing lure 14 and hook 12, may be used to allow the lure 14 to be pulled from the hook 12 in the event of hook 12 snagging. The failure level of the breakaway line 10 is chosen to occur at a slightly lower tension level than that of the associated leading fishing line 18 attaching the lure 14 to the rod and reel. In use, the coupling that is supplied with the lure 14 is first removed and the breakaway line 10 is installed in its place.

3 Claims, 2 Drawing Sheets

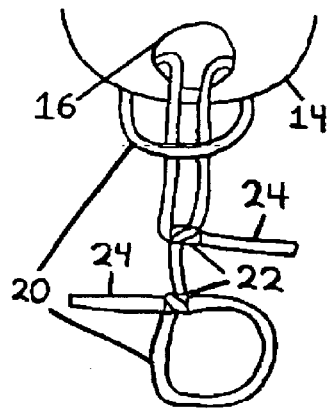
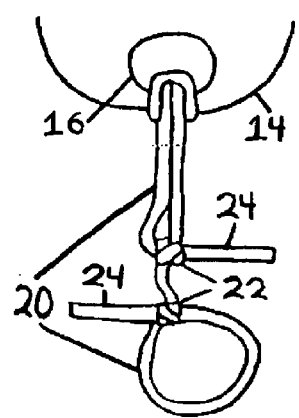
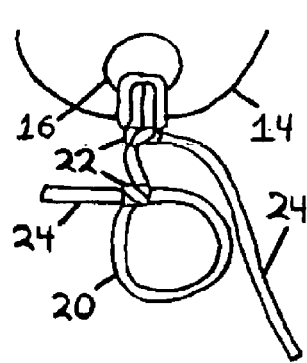
Fig. 4a  Fig. 4b  Fig. 4c
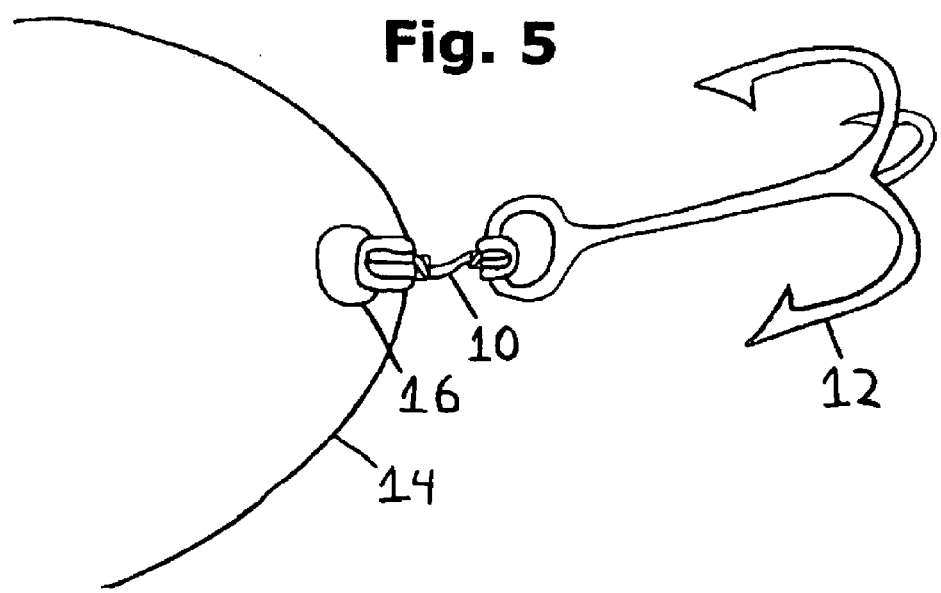
Fig. 5

BREAKAWAY LINE ATTACHMENT FOR HOOKS ON FISHING LURES

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

Field of the Invention

The invention relates to an apparatus for sport fishing and particularly, to a breakaway line adapted to be installed between a fishing lure and an associated fishing hook, which prevents loss of the lure when the hook becomes snagged.

BACKGROUND OF THE INVENTION

Discussion of Prior Art

Sport fishermen have long been plagued with the frequent occurrence of losing fishing lures when the hook becomes entangled with underwater objects. Normally, when such entanglement occurs, the fisherman cuts the fishing line or tries to pull it free until the fishing line breaks resulting in a loss of the lure. The potential for such loss necessitates that the angler must bring a number of lures with him during a fishing outing. Moreover, loss of lures translates into a loss of a considerable sum of money over the course of a fishing season, and the lifetime of the fisherman.

Numerous approaches toward avoiding the loss of lures due to hook snagging have been previously proposed. These devices generally attempted to provide a means for releasing the fishing lure from the hook and are attached to the hook and lure and release once a predetermined level of tension force is applied. This level of force is chosen somewhat less than the breaking tensile strength of the fishing line being used, thereby permitting the lure to be recovered while losing only a relatively inexpensive fishing hook.

In one such device described by U.S. Pat. No. 4,125,958, issued to Cote, a ball-and-socket arrangement is used for such a releasable coupling. This device is, however, relatively complex and expensive to manufacture. It is also believed that this device would not provide repeatable and accurate release levels.

In U.S. Pat. No. 3,541,720, issued to Buffet, a circular ring is employed to provide a releasable coupling between lure and hook. This device, however, requires specially manufactured hooks and lures in that these associated components must be configured such that the ring can be Installed. Without using a specially designed hook and lure, the Buffet coupling may be installed therebetween using lengths of fishing line attaching the components. This approach, however, would be time consuming and difficult to accomplish.

U.S. Pat. No. 2,768,468 issued to Kibler discloses yet another releasable coupling which employs a roughly figure eight shaped component having one releasing split portion. This invention includes the drawbacks of the previously mentioned Buffet reference in that specially manufactured hooks or lures are needed for a hook-to-lure attachment or the unit must be otherwise connected to them by a separate length of line. The Kibler structure is also complex and relatively expensive to manufacture.

According to U.S. Pat. No. 1,974,381, issued to Swanson, a releasable coupling is provided for a sinker which is dragged along the water bottom during fishing. This releasable coupling is made from formed wire. This device, however, would not provide an accurate and repeatable release level since the free end of the wire must be deformed significantly in order to install the sinker and redeformed to its original position. Such deformation changes the shape of the wire coupling and hence its release level.

Finally, in U.S. Pat. No. 4,696,121, issued to Hernden, an S-shaped breakaway clip is employed to serve as another releasable coupling. This device has several drawbacks, the first being that while the breakaway clip could serve to temporarily connect the lure to a hook, the resulting attachment is not physically closed, allowing for the hook to possibly pop back out of the clip. Furthermore, the installation of the clip requires placing a strain on the clip itself through pulling the ends apart in order to connect it between the hook and lure. This strain could alter the effective tensile strength of the clip, rendering it unreliable. The Hernden apparatus also requires specially manufactured stainless steel clips with a very precise tensile strength, making it expensive to produce a product with consistent quality.

A number of other prior art patents teach complicated mechanical release systems which generally employ a coil spring to sense the level of tension exerted on the hook. These devices are, however, considerably costly and therefore not suitable for everyday use by fishermen.

OBJECTS AND ADVANTAGES

In view of the above, it is a principal object of this invention to provide a breakaway coupling between a fishing lure and hook which fails at a predetermined load level enabling the lure to be pulled from the hook in the event that the hook becomes snagged. It is a further object to provide such a breakaway coupling which serves to physically attach the hook to the lure completely in a closed fashion, and is very inexpensive to manufacture and use.

The principal objects of this invention are provided by a specially designed breakaway line made from a piece of flexible line which is formed to have two loops terminating at two respective slip knots located in static positions a specific distance from each other. The loops facilitate simple and quick attachment of the breakaway line to the associated tackle components. The slip knots facilitate easy tightening of the apparatus to complete installation.

The breakaway line may be inserted between the fishing lure and associated hook and can be installed on existing fishing lures and hooks. The breakaway line according to this invention enables easily adjusted release tension levels by changing the weight tested fishing line of the stock from which the breakaway line is made. The recommendation is that the breakaway line used by the fisherman be of a tested weight of at least 2 pounds less that the fishing line used to connect the lure to the fishing rod and reel. This allows for the breakaway line to fail, rather than the leading fishing line, in the event of a snag, resulting in the loss of a hook rather than an expensive fishing lure.

Accordingly, in contrast of all of the before mentioned patents, several objects and advantages of this invention are:

(a) Since the material that makes up the breakaway line consists of standard type fishing line, it is very inexpensive to produce. There are no additional costs to manufacture specially formed metallic components that must be carefully stress tested to break at predetermined weights. Since standard type fishing line is widely used and available in a variety of weight tested forms, the primary source of material supply is very inexpensive, leaving only labor as an additional cost for production.

(b) The simplicity of the apparatus is another major advantage, allowing the average fisherman to easily attach the breakaway line to a hook and lure while in the field in a quick and easy fashion without the need to any additional specially designed parts. Prior inventions require either complex installation procedures that take too much time, making them ineffective, or additional specially designed hooks, lures, or other parts.

(c) The breakaway line constitutes a permanent, closed physical attachment between the hook and the lure until it is broken. The knots that are formed during installation are completely closed, in effect tying the hook to the lure, and are not at risk for accidentally popping off or coming apart as with prior inventions.

Further objects and advantages of the breakaway line will become apparent from a consideration of the drawings and ensuing description.

SUMMARY

In accordance with the present invention the breakaway line comprises a specially designed length of flexible line comprised of two loops and two slip knots designed for quick and easy attachment of a hook to a fishing lure.

DRAWINGS—FIGURES

In the drawings, closely related figures have the same number but different alphabetic suffixes.

FIG. 4a–4c show how the breakaway line is attached and tightened on the lure.

FIG. 5 is a close up view of the breakaway line installed between the hook and lure.

DRAWINGS—REFERENCE NUMERALS

| 10 | breakaway line |
|----|----------------|
| 12 | treble hook |
| 14 | fishing lure |
| 16 | bored hole |
| 18 | leading fishing line |
| 20 | loop |
| 22 | slip knot |
| 24 | trailing end |

DETAILED DESCRIPTION—FIGS. 1, 2, 3A–B, 4A–C, 5—PREFERRED EMBODIMENT

Figure 1:
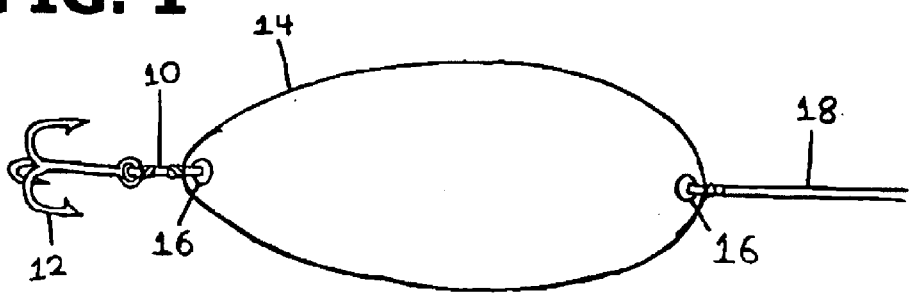
FIG. 1 shows a fishing lure and a treble hook with breakaway line according to this invention installed therebetween, and a leading fishing line attached to the lure.

FIG. 1 illustrates a breakaway line 10 according to this invention connected to a representative fishing lure 14 and a treble hook 12. Fishing lure 14 is shown as a spoon type lure and includes a pair of bored holes 16 which are used to attach the lure to a leading fishing line 18, as well as the breakaway line 10 respectively. Breakaway line 10 is also shown connected to the treble hook 12 through an eye thereof. Fishing lure 14 and treble hook 12 are exemplar only. Numerous other types of lures and hooks could be used and are within the scope of this invention.

Figure 2:
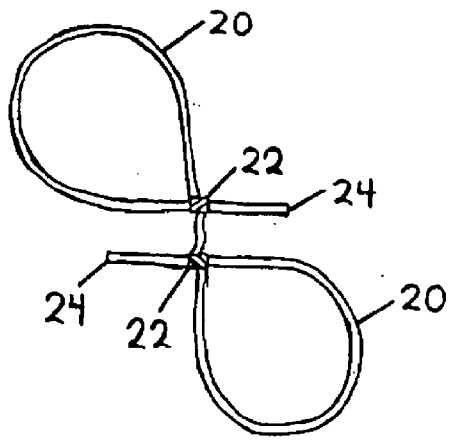
FIG. 2 is a pictorial view of the breakaway line according to this invention, before it is installed between lure and hook.

With specific reference to FIG. 2, breakaway line 10 is shown in detail. Breakaway line 10 is generally composed of two loops 20, both of which slide through a slip knot 22 when a respective trailing end 24 is pulled. The slip knots 22 are positioned in an orientation such that the distance between them is fixed at a length of approximately 5 millimeters apart. Such configuration keeps the lure 14 and hook 12 a desirable and effective distance apart once the breakaway line 10 is installed between them. The material stock for the breakaway line 10 is a standard type fishing line, size and weight test rating will vary and depend on a corresponding weight test a fisherman is using for the leading fishing line 18.

Figure 3A:
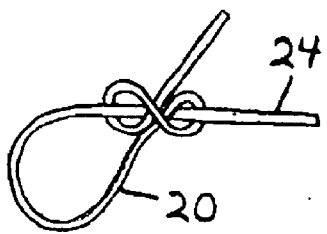
FIGS. 3a–3b show how a slip knot is formed and tightened to create the corresponding parts on the breakaway line.
Figure 3B:
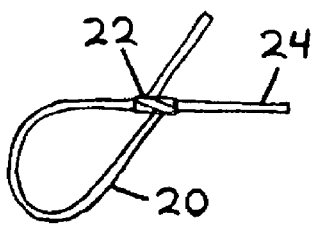

FIG. 3a illustrates in close detail how the slip knots 22 are formed. There are numerous differences in the way the knots could be tied, all of which are within the scope of this invention. For example, a second looped turn could be added on either side of the knots 22. The critical detail rests with the functionality of the knots 22 themselves, that being to allow the fishing line to slide through the knots while the knots themselves remain in a fixed position on opposite parts of the line. FIG. 3b shows the corresponding view of the slip knot 22 after it has been tightened on the line.

Operation

In use, an existing coupler between lure 14 and hook 12 is first removed. Such couplers are generally in the form of a circular wire ring and may be removed by the fisherman with pliers or fingernail. Next, the breakaway line 10 is connected first to the lure 14 by passing one loop 20 through the bored hole 16 and then passing the remaining portion of the breakaway line 10 back through the loop 20 as illustrated in FIG. 4a. Breakaway line 10 is then pulled away from the lure 14 so as to tighten the loop 20 attached to lure as indicated in FIG. 4b. Then the trailing end 24 of the attached loop 20 is tightened so that the slip knot 22 corresponding to the attached loop 20 is tightly wedged against the lure 14 as shown in FIG. 4c.

Treble hook 12 is then attached to remaining loop 20 on the breakaway line 10 by repeating the attachment procedure previously indicated. FIG. 5 illustrates final configuration of installed breakaway line 10 between fishing lure 14 and treble hook 12. Deliberate spacing between slip knots 22 ensures that the hook 12 is attached at the proper distance from the fishing lure 14.

Advantages

From the description above, a number of advantages of the breakaway line become evident:

(a) The simplicity of materials permits the manufacturer to produce the breakaway line without the need to develop additional complex parts.

(b) The design allows for quick and easy installation by fisherman in the field, even under adverse conditions.

(c) When installed, the breakaway line effectively ties the fishing lure to the hook with a closed connection, reducing any chance of the hooking accidentally popping off of the lure.

Conclusion, Ramifications, and Scope of Invention

Thus the reader will see that the breakaway line of this invention provides an inexpensive, easy to install, and reliable means for effectively attaching a hook to a fishing lure so as to cause a break in the breakaway line before a break in the leading fishing line in the event of a snag and line failure, thereby preventing the loss of an expensive fishing lure.

Although the description above contains many specificities, these should not be construed as limiting the scope of the invention but as merely providing illustrations of some of the presently preferred embodiments of this invention. Many other variations are possible. For example, the size or orientation of the loops could be different, the slip knots could be tied in many different ways, or arranged at different distances from one another, the color of the line could be altered, a different material could be used in place of standard type fishing line. Furthermore, the entire attachment could be installed differently. For example, one might attach fishing line to a lure as described by this description, but then attach the hook to the other side of the line in some different fashion, or vice versa. Fishing line could also be designed in some other fashion so as to function in a similar way, but through an altered design. The breakaway line could also be used in a similar design, but for a different function.

Accordingly, the scope of the invention should be determined not by the embodiments illustrated, but by the appended claims and their legal equivalents.

What is claimed is:

1. A breakaway line connected between a standard type fishing lure and hook, said fishing lure connected to a leading fishing line wherein said breakaway line comprising a flexible formed member having a first and second loop passing through a first and second slip knot respectively, said knots spaced at a predetermined distance from each other at a center section.

2. A method of preventing the loss of a fishing lure in a fishing tackle system including a leading fishing line and a fishing hook coupled to a fishing lure, comprising the steps of:

providing a breakaway line comprising a length of flexible line containing a first and second loop passing through a first and second slip knot respectively, said breakaway line designed to fail at a predetermined load level which is substantially less than the failure level of said leading fishing line, attaching said breakaway line to said lure by fastening said loop and tightening said slip knot, attaching said breakaway line to said hook by fastening said second loop and tightening said second slip knot, whereby in use, when a tension load is applied to said hook above said predetermined load level, said breakaway line fails, thereby releasing said hook from said lure, thereby enabling said lure to be retrieved.

3. A breakaway line adapted to be connected to a standard type fishing lure and to a fishing hook which fails at a predetermined load level which is substantially less than a failure load level of a leading fishing line attached to said lure such that said breakaway line fails when said predetermined load level is reached, enabling said lure to be retrieved, said breakaway line comprising:

a formed length of flexible line with a first and second loop portion passing through a first and second slip knot respectively, said knots spaced at a predetermined distance from each other at a center section, whereby said loop portions enable said breakaway line to be attached to said hook and said lure by inserting said loop portions through said lure or hook and passing said breakaway line back through said loops and tightening said loops with trailing ends through said slip knots, thereby tightening said breakaway line and permitting said hook or lure to be retained by said breakaway line, said breakaway line formed of a flexible line which is selected to cause said breakaway line to fall at said predetermined load level ranging from approximately 2 to 500 pounds.

\* \* \* \* \*